United States Patent [19]

Labourre

[11] 4,074,819
[45] Feb. 21, 1978

[54] ELEVATABLE TWO-PART SCAFFOLD FOR PICKING FRUIT

[76] Inventor: Abel S. Labourre, 8290 Berg St., Roseville, Calif. 95678

[21] Appl. No.: 672,247

[22] Filed: Mar. 31, 1976

[51] Int. Cl.$^2$ .............................................. E04G 1/18
[52] U.S. Cl. .................................. 214/83.1; 182/131; 182/141
[58] Field of Search ............... 214/83.1; 182/129, 131, 182/141, 148

[56] References Cited

U.S. PATENT DOCUMENTS

| | | | |
|---|---|---|---|
| 3,085,650 | 4/1963 | Merk | 182/131 X |
| 3,095,945 | 7/1963 | Mitchell | 182/148 X |
| 3,182,827 | 5/1965 | Frost | 214/83.1 |
| 3,272,282 | 9/1966 | Sanders | 182/131 X |
| 3,337,000 | 8/1967 | Giladi | 182/148 |
| 3,356,181 | 12/1967 | Granger | 182/129 |
| 3,516,512 | 6/1970 | Kupke et al. | 182/141 X |
| 3,568,796 | 3/1971 | Stanhope | 182/141 |

Primary Examiner—Lawrence J. Oresky
Assistant Examiner—Carl Rowold
Attorney, Agent, or Firm—Mark C. Jacobs

[57] ABSTRACT

An elevatable scaffold is disclosed which may be lifted into a position entirely encircling a tree to be picked. The scaffold includes a path completely encircling the tree so that the pickers may pick fruit all the way about the tree. The scaffold also includes a centrally located hopper for collecting the fruit and the floor of the hopper may be inclined so that the fruit is delivered to a central location where a gate may be released to release the fruit. One side of the path may be raised with respect to the other so that the fruit can be picked at differing vertically spaced locations.

13 Claims, 4 Drawing Figures

ELEVATABLE TWO-PART SCAFFOLD FOR PICKING FRUIT

BACKGROUND OF THE INVENTION

1. Field of the Invention

The invention relates to scaffolds; and more particularly, to improvements in scaffolds for elevationally supporting a fruit picker or the like in the manual picking of fruit for trees.

2. Description of the Prior Art

Certain fruits must be handpicked and handled with care since they bruise easily. Such fruit must be picked when ripe and, since manual labor is quite costly, it is desirable that a great amount of such fruit or the like be picked in a relatively short period of time. Since such manual labor is costly, ladders or the like cannot be used since such procedure is both time consuming and may damage the trees being picked. Accordingly, certain types of apparatuses, such as scaffolds, have been developed which essentially comprise a mobile frame and a crane-like apparatus which supports a perch or the like on which the fruit picker is positioned. The crane-like apparatus is generally movable with respect to the frame.

Since such apparatus is itself costly, there is a need for one which can encircle a fruit tree to be picked and permit one or more pickers to move about the encircled tree and pick fruit from all locations about the tree. There is also a need for such apparatus which will quickly and easily transport the fruit immediately after picking to a desired location.

SUMMARY OF THE INVENTION

It is an object of this invention to provide improvements in scaffolds for manually picking fruit or the like.

It is a further object of this invention to provide such a scaffold that may be quickly and easily moved into a desired vertical location on a tree to be picked while permitting the picker to encircle the entire tree so as to pick the fruit from all locations about the tree.

It is still another object of this invention to provide a scaffold which can encircle a tree and permit one side thereof to be raised with respect to the other so as to enable pickers to pick fruit simultaneously from different vertical locations with respect to the encircled tree.

It is another object of this invention to deliver the picked fruit automatically to a convenient location.

These and other objects are preferably accomplished by providing an elevatable scaffold that may be pivoted into a position encircling a fruit tree or the like it is desired to pick. The scaffold is raised to a desired location about the tree and one or more pickers may encircle the entire tree and pick the fruit therefrom. One side of the scaffold may be raised with respect to the other so as to enable the pickers to pick fruit from more than one vertical location with respect to the encircled tree. After picking the fruit, the picked fruit may be delivered to a convenient location by inclining the floor of a centrally located hopper and releasing a gate.

DESCRIPTION OF THE PREFERRED EMBODIMENT

Figure 1:
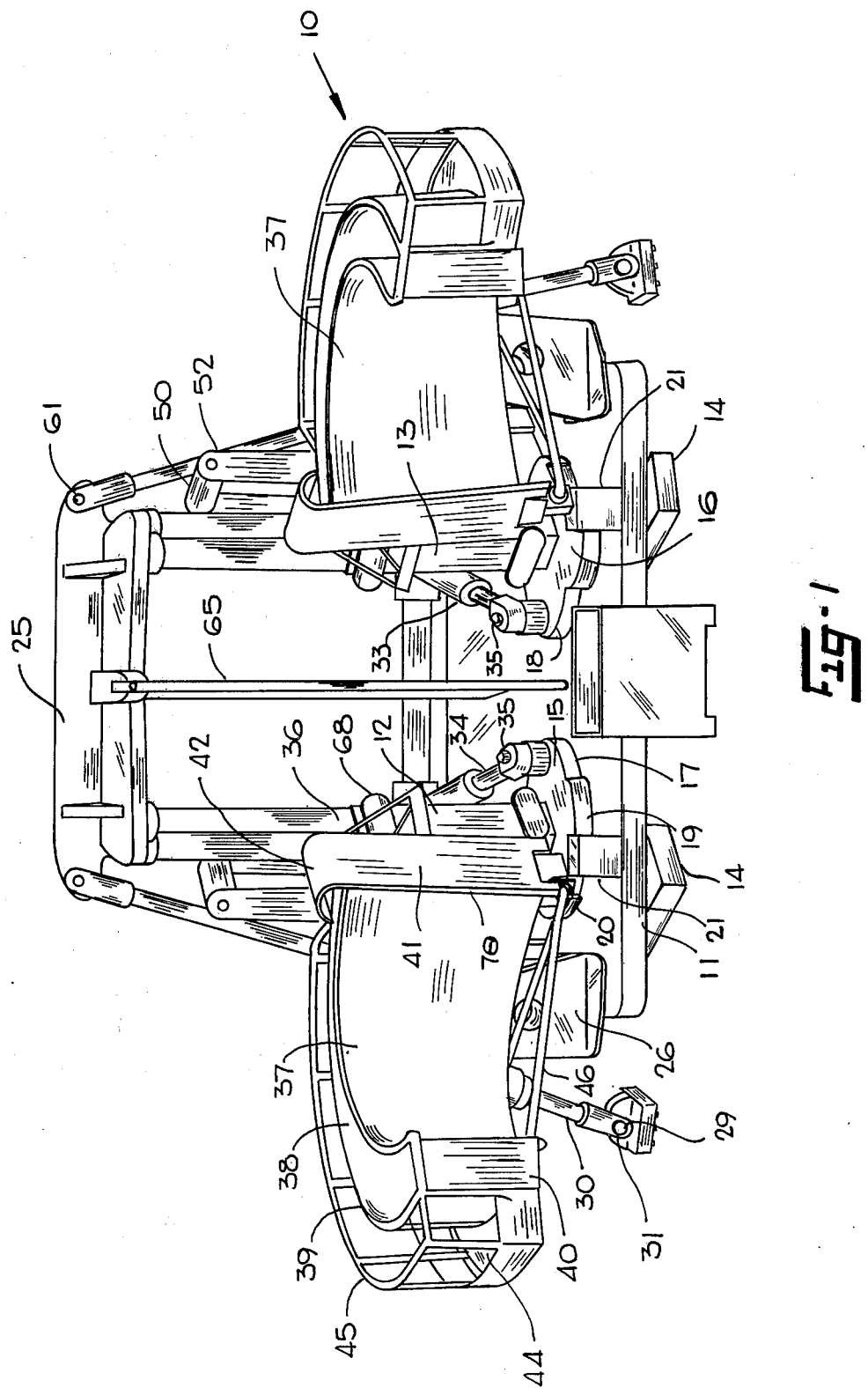
FIG. 1 is a vertical view of apparatus in accordance with the invention showing the hopper assemblies in open position prior to encircling a tree.
Figure 2:
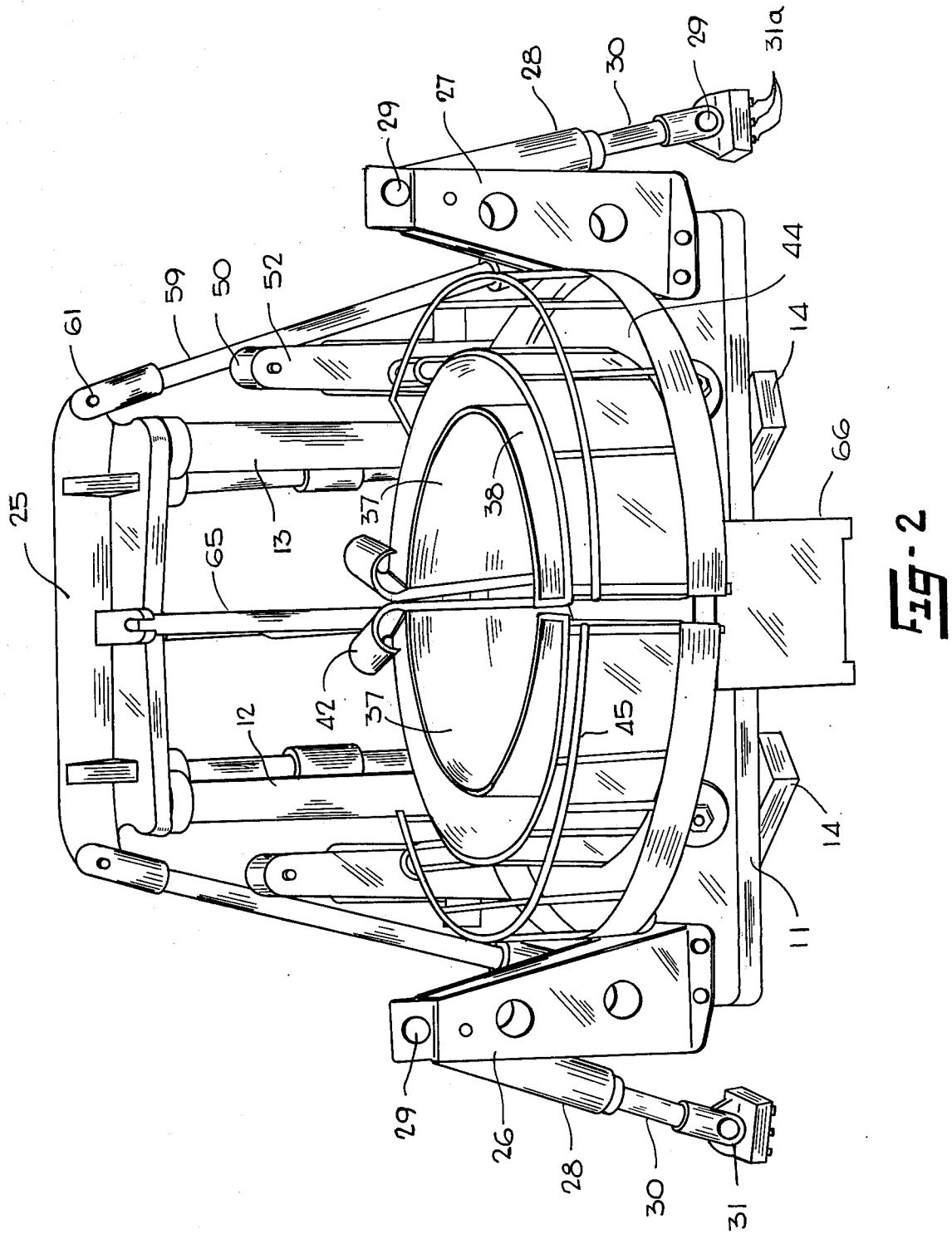
FIG. 2 is a vertical view of the apparatus of FIG. 1 showing the hopper assemblies in closed position after encircling a tree.
Figure 3:
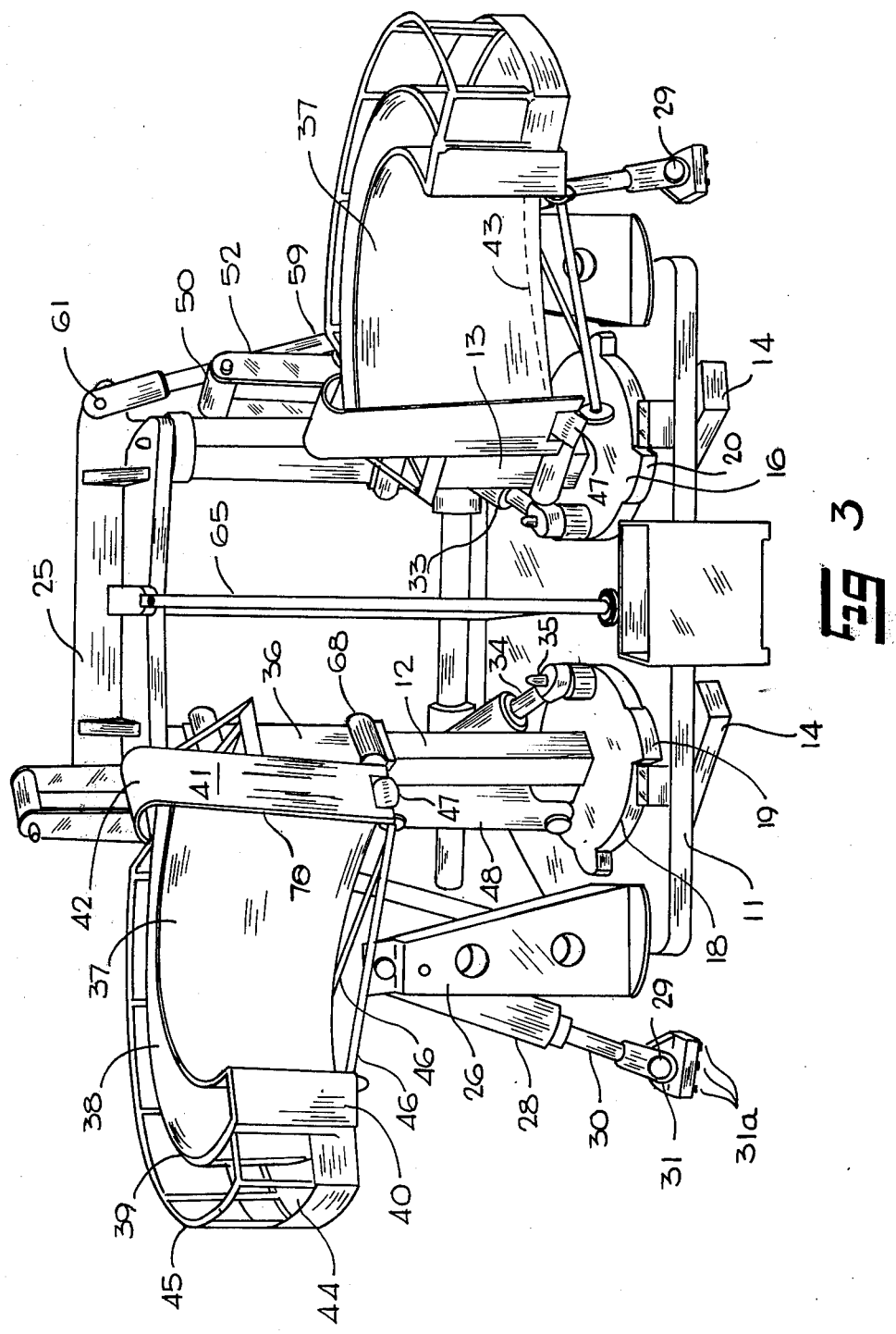
FIG. 3 is a view similar to FIG. 1 showing one of the hopper assemblies elevated with respect to the other.

Referring now to FIG. 1 of the drawing, apparatus 10 is shown which can be lifted by means of a fork lift truck or the like into a position encircling a fruit tree or the like it is desired to pick. FIG. 1 shows the apparatus 10 in open position prior to being lifted to encircle a tree. FIG. 2 shows the apparatus 10 in closed position whereby it may completely encircle a tree and permit the pickers to pick fruit all the way about the tree. FIG. 3 shows the apparatus 10 having one side raised with respect to the other so that fruit may be simultaneously picked about two differing vertically spaced locations on the tree.

Referring again to FIG. 1, apparatus 10 includes a supporting platform or base 11 having a pair of spaced guide bars 12,13 extending vertically upwardly therefrom. Base 11 may be supported on its undersurface by spaced feet 14. Bars 12,13 may be integral with a pair of turntables 15,16 which may be fixed for rotation in any suitable manner with respect to base 11, such as bearing means (not shown). For example, each turntable 15,16 may comprise a bottom member 17 fixedly secured to base 11, as by bolts (not shown) coacting with upper member 18 so that upper member 18 rotates with respect to lower member 17. The upper member 18 includes spaced stop pawls or flanges 19,20 adapted to engage a stop member 21 fixed to base 11 and upstanding therefrom so that turntables 15,16 rotate in an arc between fixed, predetermined positions.

Figure 4:
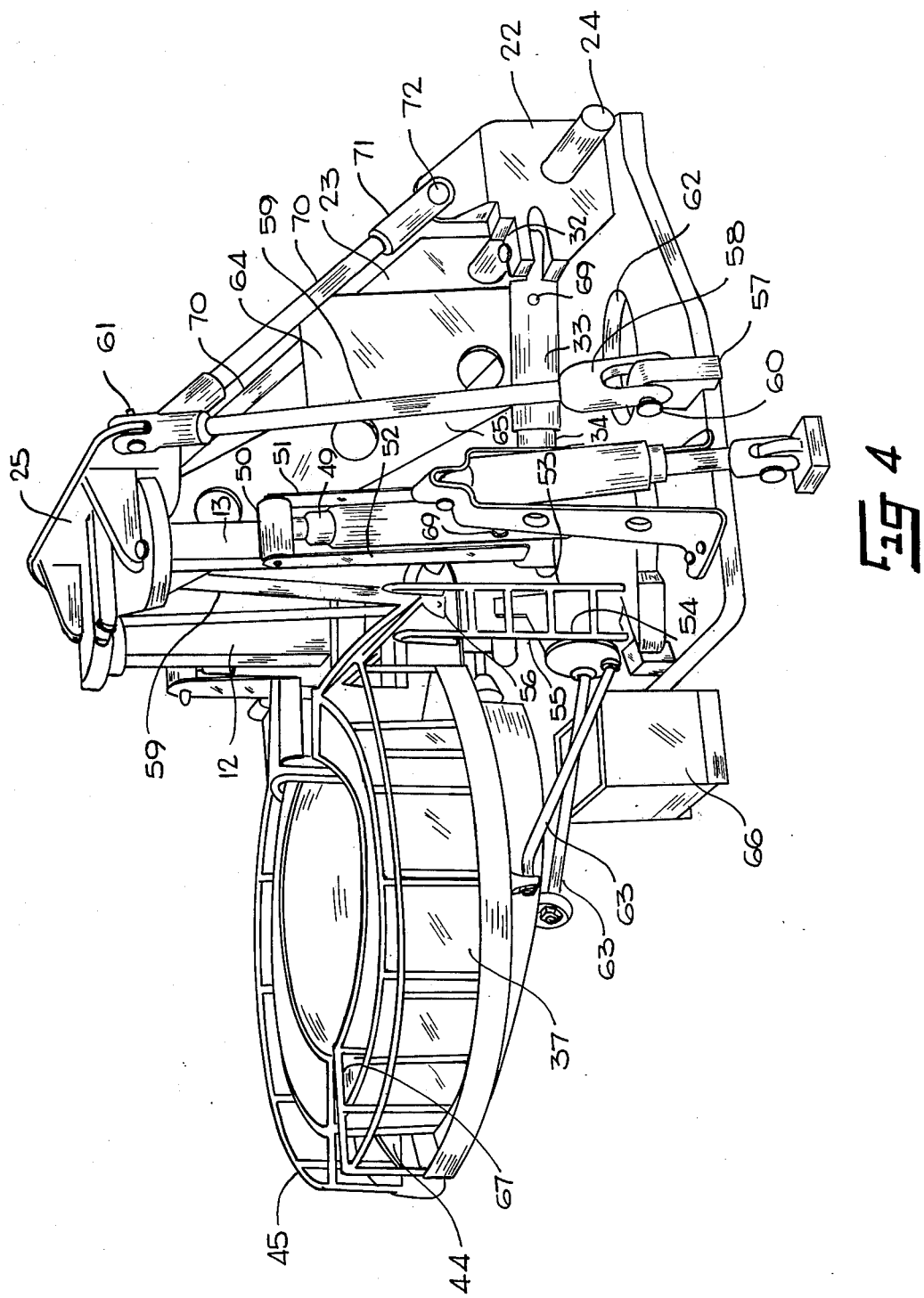
FIG. 4 is a side view of the apparatus of FIG. 2.

As seen in FIG. 4, a pair of upstanding spaced flanges 22,23 are integral with base 11 for receiving a bar or rod 24 therethrough. As can be seen, a space is formed between rod 24 and base 11 between flanges 22,23 so that the fork lift of a fork lift truck (not shown) or the like may be inserted therein and the entire apparatus 10 lifted to a desired location and if desired, raised vertically. Turning now to FIG. 2.

Guide bars 12,13 are interconnected by a cross-brace 25. Upstanding flanges 26,27 may be provided on base 11 having one end of a piston cylinder 28 pivotally connected thereto by pivot pins 29. Each cylinder 28 receives a piston rod 30 fixedly secured in a stabilizing leg 31 adapted to rest on the ground and support apparatus 10. Legs 31 may have treads 31a or the like on their undersurface, if desired. Cylinder 28 and rod 30 may be automatically telescoping to accomodate for an even terrain on which apparatus 10 rests. Turning now to FIG. 1.

Each flange 22,23 also include flange portions 32 receiving therein a hydraulic ram cylinder 33. A cylinder 34 is slidable in each ram cylinder 33 and fixedly secured to the upper member 18 of turntables 15,16 via bolts 35 or other suitable means so that turntables 15,16 may be rotated when the ram cylinders 33 are actuated. Per FIG. 4 each flange 22 extends upward from base 11 for pivotally receiving therein the lower bifurcated end of a spaced stabilizing bar 70. The lower end of each such bar 70 is connected via pivot pins 72 to flanges 22 and the upper end of each such bar is pivotally connected via pivot pins, (not shown) to suitable flanges or to portions of cross-brace 25. In the embodiment shown, bar 70 terminates in end portion 71.

Each guide bar 12,13 is generally square-shaped and receives thereabout a sleeve 36 of like internal configuration so that sleeves 36 are rotated when bars 12,13 are rotated. Each sleeve 36 has integral therewith a generally semi-circular hopper 37. Each hopper 37 is comprised of a pair of spaced generally semi-circular walls 38,39 connected at one end in end walls 40 and at the other end in walls 41 which, as will be discussed, form movable gates for the hopper. These gates or walls 41 are curved as at top 42 as shown for reasons to be discussed. This is best seen in FIG. 3.

Walls 38,39 are also interconnected by a hopper floor 43 which may be inclined from end wall 40 to gates 41 for reasons also to be discussed and as shown in dotted lines in FIG. 3. A path or platform 44 encircles each hopper 37 of a sufficient width to enable a picker to walk around with comfort. Safety rails 45 may extend about each path or platform 44 to provide both a handhold and prevent the picker from falling. One or more bracing members 46 may extend from end wall 40 under floor 43 to a point below the floor 43 at gate 41 as shown. As shown in FIG. 3, each floor 43 may terminate in a downwardly turned lip 47 or the like to assist in the removal of fruit.

A pair of hydraulic rams 48 are fixedly secured and upstanding from each turnable 15,16 to provide means for lifting hoppers 37. As shown in FIG. 4, each ram 48 includes a ram cylinder rod 49 fixedly secured to a sleeve 50 having connected thereto at each end a pair of downwardly extending flanges 51,52 fixedly secured at their lower ends to sleeves 36 via flanges 53. As also shown in FIG. 4, a step ladder 54 is also secured to supporting structure 55 between sleeves 36 and each hopper 37. This supporting structure 55 includes a floor 56 generally aligned with path or platform 44. Ladders 54 of course extend from the bottom of structure 55 to a point above floor 56 as shown. It can be appreciated that, when rams 48 are activated, hoppers 37 may be raised.

Spaced flanges 57 may extend upwardly from base 11 for pivotally receiving therein the lower bifurcated end 58 of a plurality of spaced stabilizing bars 59. The lower end of each bar 59 is connected, via pivot pins 60, to flanges 57 and the upper end of each bar 59 is pivotally connected, via pivot pins 61, to suitable flanges or portions of cross-brace 25.

One or more apertures 62 may be formed in base 11, if desired, to reduce the weight thereof. Other cross-braces 63 may extend between each hopper 37 and supporting structure 55 also as shown. A hold-down brace 64 may be provided upstanding from base 11 and connected at the top at generally the back of the midpoint of cross-brace 25. A vertical hold-down bar 65 may be connected to the front of generally the midpoint of cross-brace 25 and the base 11. A removable basket 66 may be provided for receiving fruit from hoppers 37 when gates 41 are opened.

The entire interior of each hopper 37 may be padded with suitable cushioning material 67 for cushioning the fall of fruit therein.

Although sleeves 36 may be movable along guide bars 12,13 by merely providing clearance therebetween, each sleeve 36 may include rollers 68 therein for ease of movement along guide bars 12,13.

As discussed heretofore, gates 41 may be manually moved to open each hopper 37. This may be accomplished by merely bending in the long sides of each gate 41 and inserting flanged ends of the spaced walls 38,39 therein.

Obviously, various nuts, bolts, braces, flanges, etc., may be provided, some as shown and described, by one skilled in the art to provide apparatus 10 sufficient to carry out the teachings of the invention. Further, any suitable materials, e.g. metal, wood or plastic where appropriate, may be used. Although ram cylinders 33 and 48 have been disclosed as closed systems, obviously suitable provisions, such as fluid inlets 69, may be provided for connecting up a source of hydraulic fluid (not shown) and selectively supplying fluid to each ram cylinder 33,48.

In operation, the fork lift of a fork lift truck is inserted under bar or rod 24 between flanges 22,23 and the entire apparatus 10 is lifted to a desired position. At this point, ram cylinders 33 are inactivated so that hoppers 37 are in the FIG. 1 position. The truck moves apparatus 10 to a position wherein the tree desired to be picked lies within the general area between hoppers 37 in FIG. 1. Fluid is then supplied to each cylinder 33 via inlets 69 to move rods 34 which thereby moves the upper members 18 of each turntable 15,16 from the FIG. 1 position to the FIG. 2 position, the extent of movement of turntables 15,16 being controlled by stop members 21. The guide bars 12,13, carried by turntables 15,16, are also moved thus closing the semi-circular hoppers 37 about the tree to be picked (FIG. 2 position). The rods 34 of ram cylinders 33 are retained in extended position until it is desired to remove apparatus 10.

In this position, a picker can walk up ladder 54 to floor 56, and then commence entry on the platform 44. He can then move about the tree, pick fruit, and drop the picked fruit onto the inclined floor 43 of each hopper 37. When that horizontal area about the tree is picked, fluid may be supplied to ram cylinders 48 to an extended position and thus raise hoppers 37 with respect to base 11 from the FIG. 2 to the FIG. 3 position. As shown, if desired, as for example, if one picker finishes his level before the other, only one hopper need be raised with respect to the other. This may be accomplished by providing fluid to only one ram cylinder 48. Further, the amount of fluid introduced to cylinders 48 may be controlled so that each hopper 37 may be raised to differing vertical positions between the FIG. 1 and FIG. 2 positions.

After picking the fruit, box or basket 66 may be placed below gates 41 and one or both gates 41 may be lifted manually to permit the fruit, because of the inclination of floor 43, to roll out of each hopper 37, over lip 47, and into basket 66.

When storing apparatus 10 on the ground, legs 31 may be used as stabilizers, particularly if the ground is not level. In addition, each piston 30 may be operated independently to achieve the leveling desired.

While gates 41 have been indicated to manually operate, it is within the scope of this invention for them to be hydraulically operated, or operated by electric motors, each with suitable controls, not shown. Similarly other types of gate means can be provided for the release of the collected fruit, such as by the provision of downwardly opening doors in the floor of the hoppers 43, the control of same being within the skill of the art.

Although the prime purpose of this invention is for the collection of fruit, and especially citrus fruit, it is seen that it is within the scope of this invention to line hopper 37, with a padding material, not shown, to prevent abrasion to such fruits as peaches and plums. The apparatus also readily lends itself for use in trimming of trees as well.

Many other modifications may be suggested to one skilled in the art, and the invention is to be limited only by the claims appended hereto.

We claim:

1. A scaffold for picking fruit from a tree comprising:
   a support base;
   a pair of movable generally semi-circular hopper assemblies mounted on said base;
   hopper assembly moving means associated with said base for moving both of said hopper assemblies thorugh a generally horizontal plane from a first open position whereby said assemblies may be brought into a position encircling a tree to a second closed position completely encircling said tree;
   fruit receiving means associated with each of said hopper assemblies for receiving fruit picked from said tree consisting of a continuous bin disposed along the inner side surfaces of said assemblies and extending substantially 360° around said tree when said assemblies are in said closed position;
   walk means associated with each of said hopper assemblies adjacent said fruit receiving means for permitting a picker to walk substantially 360° around said tree and pick fruit therefrom; and
   means for independently elevating each of said hopper assemblies along a vertical hopper assembly support member pivotally attached to said base.

2. The scaffold of claim 1 further including second hopper assembly means associated with each of said hopper assemblies for moving each of said hopper assemblies in a direction generally normal to the direction of movement of said first-mentioned hopper assembly moving means.

3. The scaffold of claim 2 wherein said second hopper assembly moving means includes independent hopper assembly moving means for moving one of said hopper assemblies in a direction generally normal to the direction of movement of said first-mentioned hopper assembly moving means with respect to the other hopper assembly.

4. The scaffold of claim 3 wherein both said first and second hopper assembly moving means include hydraulically actuated ram means operatively connected between said base and both of said hopper assemblies for moving said hopper assemblies.

5. The scaffold of claim 1 wherein said fruit receiving means includes each of said hopper assemblies having an inclined floor extending from a high point adjacent one end of each of said hopper assemblies to a point lower than said high point adjacent a vertically movable gate closing off the other end of each of said hopper assemblies.

6. The scaffold of claim 1 further including fork lift receiving means associated with said base for receiving therein the fork lift of a fork lift truck permitting the entire scaffold to be elevated by said truck.

7. In a scaffold for picking fruit from a tree comprising:
   a base;
   a pair of rotatable turntables mounted on said base;
   stop means on said base operatively engaging said turntables for limiting rotation thereof;
   a pair of spaced guide bars vertically extending from each of said turntables, each of said guide bars being noncircular in cross-section;
   a pair of sleeves mounted for movement in a vertical direction on each of said guide bars, said sleeves having throughbores receiving each of said guide bars therethrough with said throughbores being similarly configured as the cross-section of said guide bars;
   a pair of generally semi-circular hopper assemblies fixedly secured to each of said sleeves and extending radially therefrom in generally a horizontal plane; and
   each of said hopper assemblies including a generally semi-circular walkway thereabout and a generally semi-circular fruit receiving hopper contiguous to an inner side surface of said walkway and extending substantially 360° around said tree when said assemblies are rotated to a closed position surrounding the tree; means for independently elevating each of said hopper assemblies along said guide bars; and means operatively connected to each of said rotatable turntables for rotating said turntables.

8. In the scaffold of claim 7 wherein each of said hoppers is closed off at one end by a vertical end wall and at the other end by a vertically movable gate, said hoppers each including a floor extending from the bottom of said end wall to the bottom of said hopper, said floor being inclined from a high point at said end wall to a lower point adjacent said gate.

9. In the scaffold of claim 7 wherein said base includes a pair of upwardly extending spaced flanges, and a bar fixedly secured to both said flanges and vertically spaced from said base.

10. In the scaffold of claim 7 further including hydraulic cylinder means operatively connected to each of said turntables for rotating said turntables.

11. In the scaffold of claim 7 further including hydraulic cylinder means operatively connected to each of said sleeves for moving each of said sleeves vertically along said guide bars.

12. In the scaffold of claim 11 further including roller means associated with each of said sleeves for engaging each of said guide bars.

13. In the scaffold of claim 7 further including stabilizing means associated with said base for stabilizing said base when said scaffold is supported on a supporting surface in a generally horizontal position on said supporting surface.

* * * * *